Patented Sept. 8, 1925.

1,552,804

UNITED STATES PATENT OFFICE.

JOHN M. DONOHUE, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing.   Application filed February 24, 1923.   Serial No. 621,064.

*To all whom it may concern:*

Be it known that I, JOHN M. DONOHUE, a citizen of the United States of America, residing at Rochester, in the county of Monroe and State of New York, have invented certain new and useful Improvements in Cellulose-Ether Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use. Other objects will hereinafter appear.

In U. S. Patent No. 1,188,376, Lilienfeld, June 20, 1916, there are disclosed a series of alkyl ethers of cellulose. Certain of these are practically insoluble in water, and my invention relates, but is not limited, to the ethers having that property. While cellulose ethers form thin solutions in the lower monohydroxy aliphatic alcohols or in butyrates of monohydroxy aliphatic alcohols containing from 3 to 5 carbon atoms inclusive, it has been fund that such single solvents by themselves do not dissolve a sufficient proportion of the ethers to make a composition or dope of the desired concentration and flowable qualities, such as may be used in the manufacture of photographic film base by customary methods or in the plastic arts.

I have discovered that an adequately strong and useful solvent may be prepared by mixing one or more of the butyric acid esters of the monohydroxy aliphatic alcohols containing from 3 to 5 carbon atoms inclusive with one or more of the lower monohydroxy aliphatic alcohols. By lower monohydroxy aliphatic alcohols I mean those having less than 6 carbon atoms. While the propyl butyrates, butyl butyrates and amyl butyrates are all useful, in the preferred embodiment of my invention I employ one of the amyl butyrates, say isoamyl butyrate.

While the ingredients may be mixed in widely varying proportions, it is noted, by way of example, that a particularly useful composition can be prepared by mixing equal parts by weight of the butyrate and the alcohol, say isoamyl butyrate and methyl alcohol. In the preferred form of my invention I dissolve 1 part by weight of the cellulose ether, say water-insoluble ethyl cellulose in from 5 to 7 parts by weight of this solvent mixture. The ingredients by themselves are not sufficiently powerful to make properly flowable dopes of this strength. Of course, the proportion of mixed solvent or the proportion of the volatile ingredients may be increased to adapt the composition to the lacquering art, as will be understood by persons skilled therein.

Other substances which impart additional suppleness, or incombustibility, or other qualities, to the film may also be added to the dope, such, for instance, as triphenyl or tricresyl phosphate, monochlornaphthalene, camphor, etc. The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter.

In the formation of a film by the spreading of such solution and the evaporation of its volatile ingredients a considerable amount of the butyrate remains behind, because of its relatively low volatility. It imparts useful plastifying and other properties to the film, which is normally flexible and transparent.

Having thus described my invention, what I claim as new and desire to secure by Letters Patent is:

1. A composition of matter comprising cellulose ether and a butyric acid ester of a monohydroxy alipathic alcohol having more than 2 and less than 6 carbon atoms, the ingredients being homogeneously mixed in unprecipitated form.

2. A composition of matter comprising cellulose ether dissolved in a mixture of a butyric acid ester of a monohydroxy aliphatic alcohol having more than 2 and less than 6 carbon atoms, and a lower monohydroxy aliphatic alcohol.

3. A composition of matter comprising cellulose ether dissolved in a mixture of methyl alcohol and one of the amyl butyrates.

4. A flowable composition comprising 1 part of cellulose ether dissolved in from 5 to 7 parts by weight of a mixture of a lower monohydroxy aliphatic alcohol and a butyric acid ester of a monohydroxy aliphatic alcohol containing more than 2 and less than 6 carbon atoms.

5. A composition of matter comprising cellulose ether dissolved in a mixture of equal parts by weight of a lower monohydroxy aliphatic alcohol and a butyric acid ester of a monohydroxy aliphatic alcohol containing more than 2 and less than 6 carbon atoms.

6. A composition of matter comprising 2 parts by weight of water-insoluble ethyl cellulose, 7 parts of isoamyl butyrate and 7 parts of methyl alcohol.

7. As an article of manufacture, a film comprising cellulose ether and a butyric acid ester of a monohydroxy aliphatic alcohol containing more than 2 and less than 6 carbon atoms.

8. As an article of manufacture a tough, flexible, transparent film comprising water-insoluble ethyl cellulose and isoamyl butyrate.

Signed at Rochester, New York, this 16 day of February, 1923.

JOHN M. DONOHUE.